US010132508B2

(12) United States Patent
Frilev et al.

(10) Patent No.: US 10,132,508 B2
(45) Date of Patent: Nov. 20, 2018

(54) ELECTRONIC CONVERTER UNIT FOR A PUMP AND A METHOD FOR COMMUNICATING WITH THE ELECTRONIC CONVERTER UNIT

(71) Applicant: Grundfos Holding A/S, Bjerringbro (DK)

(72) Inventors: Karsten Frilev, Støvring (DK); Simon Mølgaard Møller, Herning (DK); Rose Kampmann, København (DK)

(73) Assignee: Grundfos Holding A/S, Bjerringbro (DK)

( * ) Notice: Subject to any disclaimer, the term of this patent is extended or adjusted under 35 U.S.C. 154(b) by 0 days.

(21) Appl. No.: 15/532,294

(22) PCT Filed: Dec. 3, 2015

(86) PCT No.: PCT/EP2015/078547
§ 371 (c)(1),
(2) Date: Jun. 1, 2017

(87) PCT Pub. No.: WO2016/087595
PCT Pub. Date: Jun. 9, 2016

(65) Prior Publication Data
US 2017/0328367 A1 Nov. 16, 2017

(30) Foreign Application Priority Data

Dec. 3, 2014 (WO) .................. PCT/EP2014/076416
Mar. 10, 2015 (WO) .................. PCT/EP2015/054980

(51) Int. Cl.
F24D 19/10 (2006.01)
F04D 13/06 (2006.01)
(Continued)

(52) U.S. Cl.
CPC ...... *F24D 19/1012* (2013.01); *F04D 13/0686* (2013.01); *F04D 15/0066* (2013.01);
(Continued)

(58) Field of Classification Search
CPC ...... F04D 13/0686; G08B 5/228; F04B 49/06; F04B 49/065; H04J 14/0213;
(Continued)

(56) References Cited

U.S. PATENT DOCUMENTS

2005/0054292 A1* 3/2005 Janusz ..................... H04Q 9/00
455/41.2
2005/0129535 A1 6/2005 Beyer et al.
(Continued)

FOREIGN PATENT DOCUMENTS

CN 107002693 A * 8/2017 ......... F04D 13/0686
EP 0 355 255 A2 2/1990
(Continued)

*Primary Examiner* — Hai Phan
*Assistant Examiner* — Anthony D Afrifa-Kyei
(74) *Attorney, Agent, or Firm* — McGlew and Tuttle, P.C.

(57) ABSTRACT

An electronic converter unit (30, 86, 87) for being arranged external to a pump unit (10) is described. The pump unit (10) includes a housing (12), which comprises a signal source (16, 18) for emitting a signal. The electronic converter unit (30, 86, 87) comprises a signal detector (40) for measuring the signal emitted from the signal source (18) of the pump unit (10). The electronic converter unit (30) further comprises a converter unit (41) for converting said signals to electrical signals, and transmitting means (42) for transmitting the electrical signals to an external communication unit (50). The electronic converter unit (30, 86, 87) is further configured to operate in a signal converter mode (30) and a signal repeater mode (86, 87).

16 Claims, 9 Drawing Sheets

(51) Int. Cl.
  *F04D 15/00* (2006.01)
  *H04Q 9/00* (2006.01)
  *F24D 3/10* (2006.01)
  *G08B 5/22* (2006.01)
(52) U.S. Cl.
  CPC ........... *F04D 15/0088* (2013.01); *F24D 3/10* (2013.01); *F24D 19/1015* (2013.01); *F24D 19/1024* (2013.01); *F24D 19/1048* (2013.01); *G08B 5/228* (2013.01); *H04Q 9/00* (2013.01); *H04Q 2209/43* (2013.01); *Y02B 30/745* (2013.01)
(58) Field of Classification Search
  CPC .............. H04B 10/2575; H04B 10/503; H04B 10/291; H04B 10/807; H04B 10/808
  USPC ........ 370/338; 455/41.1, 41.2, 39, 7, 15, 16, 455/13.1; 340/539.1, 540, 541; 417/44.11, 63, 48; 343/760, 894; 375/340, 211, 219, 214, 325, 360
  See application file for complete search history.

(56) References Cited

U.S. PATENT DOCUMENTS

| | | |
|---|---|---|
| 2009/0059814 A1 | 3/2009 | Nixon et al. |
| 2013/0089004 A1 | 4/2013 | David et al. |
| 2014/0314062 A1 | 10/2014 | Loebs |

FOREIGN PATENT DOCUMENTS

| | | | |
|---|---|---|---|
| EP | 1 146 231 A2 | 10/2001 | |
| EP | 1 321 912 A1 | 6/2003 | |
| EP | 2 778 423 A1 | 9/2014 | |
| WO | 2013/041616 A1 | 3/2013 | |
| WO | WO 2013041616 A1 * | 3/2013 | ............. F04D 15/00 |
| WO | 2013/117401 A2 | 8/2013 | |

* cited by examiner

ELECTRONIC CONVERTER UNIT FOR A PUMP AND A METHOD FOR COMMUNICATING WITH THE ELECTRONIC CONVERTER UNIT

FIELD OF THE INVENTION

The present invention relates to an electronic converter unit for use with a pump unit, such as a centrifugal pump. The invention further relates to a kit of parts comprising a pump unit and at least two electronic converter units. The invention additionally relates to a system comprising a pump unit, at least two electronic converter units, and an external communication device, such as a smart phone. Finally, the invention relates to a method for communicating with the electronic converter unit.

BACKGROUND OF THE INVENTION

Many modern fluid pump systems are provided with various types of controls in order to control pump units in specific ways. Circulation pumps are often intended to deliver a specific head and flow rate at given circumstances in order to meet particular requirements. To meet the different requirements, the pump units may be controlled according to different control patterns by changing one or more drive parameters. This may be done by the user of the pump by use of input means provided on the pump itself, e.g. via an interface, such as a touch screen, on the pump unit. However, providing a pump unit with a display or a touch screen adds costs to the production price of the pump unit and thus also to the purchase price for the end consumer. Further, it entails a security risk, if anybody can gain access to the control system and to control the system to drive the pump unit at erroneous drive conditions.

EP 1 321 912 discloses a pump unit with a control or regulating device for controlling or regulating a drive of the pump, wherein the device has a light source for emitting light, which can be used for the transmission of data to a reader device.

WO 2013/041616 discloses a pump unit having an electrical drive motor and a control device for controlling the drive motor.

WO 2013/117401 discloses an electric motor, which is provided with a signal device for indicating at least two different operating states. For this purpose, the signal device has six light-emitting diodes, which are connected to flash mutually offset in time from one another, when the motor is running, so that they represent the rotary motion of the motor.

While a simple diode display may provide a simple visual indication to a user, e.g. green light for correct operating conditions and red light for faulty operating conditions, it is difficult to extract more detailed information about the operating condition of the pump. Information about pump status can be extracted by wired transfer of information according to standardized data protocols.

Also wireless transmission of pump data is known. The Applicant thus manufactures and markets a product called "Grundfos Go", which is a communication solution between a centrifugal pump and a smart phone. The communication is done via an electronic converter unit—a dongle—which can be inserted in an input port of the smart phone or be placed remotely from the smart phone. The control housing of the pump comprises a built-in communication module for wireless radio frequency communication with the electronic converter unit via the GLoWPAN protocol. The electronic converter then converts the data from GLoWPAN format to Bluetooth® format and transmits the data to the smart phone. This solution has the drawback that the pump needs a relatively expensive radio frequency transmission module. Further, the transmission distance between pump, dongle and smart phone is limited. Based on these drawbacks the present invention aims at providing a simple communication solution between a pump and a smart device (such as phone or a tablet), which solution is versatile, easy to handle and gives a satisfactory transmission range.

SUMMARY OF THE INVENTION

It is an object of the invention to obtain new devices, systems, and methods, which overcome or ameliorate at least one of the disadvantages of the prior art or which provide a useful alternative.

In one aspect, the invention provides an electronic converter unit to be arranged external to a pump unit, wherein the pump unit includes a housing, which comprises a signal source for emitting a signal. The electronic converter unit comprises:
  a signal detector for detecting the signal emitted from the signal source of the pump unit,
  a converter unit for converting said signals to electrical signals, and
  transmission means for transmitting the electrical signals to an external communication unit. The invention is characterised in that the electronic converter unit further is configured to operate in a signal converter mode using a first signal detector and a signal repeater mode using a second signal detector and that the electronic converter unit automatically sets itself to signal converter mode, if the first signal detector detects a signal from the signal source of the pump unit, and to signal repeater mode, if the first signal detector does not detect signals from the signal source.

Thereby, the same communication unit, i.e. the electronic converter unit, may be used either as a converter unit or a repeater and combined the reach of the communication unit may be extended, which can be a huge benefit in for instance multi-storey houses. The communication units may be interchanged without impairing the signal path between the pump unit and the external communication device, such as a smart phone.

The invention has the advantage that the pump unit does not have to be equipped with relatively expensive radio frequency communication circuitry. Instead a low cost communication solution is found by letting the electronic converter unit taking over the long distance signal transmission while the pump is equipped with relatively low cost and low range communication circuitry. In manufacturing this means a considerable cost reduction. The invention enables read out of internal pump parameters to the outside world with a versatile solution where a service technician can create an on-the-spot communication interface with the pump also over a long communication distance.

While the unit is in the following mostly defined as an electronic converter unit, it is clear that the invention relates to an electronic communication unit, which is configured to operate as an electronic converter unit (in the converter mode) and as a repeater (in repeater mode). In the following description, there may be referred to an electronic converter unit, a communication unit, or a repeater. However, in context of the invention, it is clear that it relates to identical electronic units, which may operate in different modes, e.g. as a signal converter or a repeater. "Signal converter mode"

is to be understood as a mode where one physical signal is converted into another physical signal, e.g. a light signal into a radio frequency signal, or as a protocol conversion from one digital protocol into another digital protocol. "Signal repeater mode" is to be understood as a mode, where an incoming signal is repeated by the electronic converter unit, i.e. the contents of a data telegram remains the same.

By arranged external to the pump unit it is meant, that the electronic converter unit may be arranged near or at or on the pump unit and is not part of the pump unit itself.

The electronic converter unit is configured to set itself to signal converter mode, if it detects the signal from the signal source of the pump unit. Thus, an operator merely has to position the electronic converter unit near or at the pump and it automatically sets itself up to function as a signal converter. Also, the electronic converter unit is configured to set itself to signal repeater mode, if it does not detect signals from the signal source of the pump unit. Thus, an electronic converter unit will automatically start to listen for signals to be repeated and sent from another unit, if is not arranged within the signal reach of a pump unit. The automated detection and shift into the correct mode makes it easy for the service technician using the inventive electronic converter unit. He or she does not have to program anything.

The dual functions of the electronic converter unit may be achieved by designing two communication inputs—first and second signal detectors—into the converter unit. The first input is a signal input for a first type of signals such as optical signals. Preferably the frequency range of this input is in a low range 1 Hz to 1 MHz. The second input receives a wireless high frequency signal in the range from 100 MHz to 3 GHz. The electronic converter unit has an antenna used for both receiving and sending data. Thus, the electronic converter unit has one input for signals to be converted, and another input for signals to be repeated.

In an advantageous embodiment, the electronic converter unit in signal converter mode receives the signal from the signal source of the pump unit, which signal is to be sent to the external communication unit, and wherein the converter unit in signal repeater mode is configured to receive electrical signals from an identical converter unit and relays the electrical signal to a further identical converter unit or the external communication unit. Once the correct mode of operation has been initiated the electronic converter unit operates in signal converter mode or signal repeater mode. In the latter mode several units can be connected, e.g. four units giving a wide signal range.

In one advantageous embodiment, the electronic converter unit is configured to send telegrams in a broadcasting mode, preferably as unidirectional communication. In the present invention the Bluetooth® broadcasting function is preferably used instead of the commonly used bidirectional communication (Bluetooth® pairing) between two communicating units. Although the bidirectional communication enhances robustness in the exchange of data, tests have shown that unidirectional communication with sufficient high frequency of digital telegrams suffices to get a satisfactory result. Thereby, the service technician may save time in setting up a communication path without having to pair devices. More specific the Bluetooth® Low Energy protocol, also called BLE or Bluetooth® Smart or 4.0, is used in its non-connectable mode where advertise messages are broadcasted to other repeaters or handheld devices according to the invention.

In another advantageous embodiment, the electronic converter unit in signal repeater mode is configured to be synchronised with another identical electronic converter unit. This means that a repeater may be synchronised with an electronic converter unit or another repeater to be only activated at timing instants, where the electronic converter unit or another repeater is expected to send a telegram or data package. In other words, the repeater only listens when an expected package or telegram is to be sent. This saves energy and battery life.

In yet another advantageous embodiment, the electronic converter unit is configured to receive and transmit telegrams including data packages comprising at least first data packages and second data packages, and wherein the first data packages are transmitted according to a first repetition rate and the second data packages are sent according to a second repetition rate. In other words the data packages or telegrams are prioritised. Higher prioritised telegrams may then be sent more frequently than lower prioritised telegrams. The first packages may comprise variable data, such as measured flow rate, measured pressure and the like, and the second packages may comprise static data, such as pump model type, serial number and the like, and wherein the first repetition rate is higher than the second repetition rate. It is seen that the variable data that changes rapidly may then be transmitted often, while static or constant data is only sent out less often. The static data may be sent out sequentially as partial data packages and the receiver may build the static data from the sequentially sent partial data packages. The first repetition rate may be at least three times larger and advantageously at least five times larger than the second repetition rate. Accordingly, the highly variable data is updated often and static data may need only to be updated or checked at a lower repetition rate. Thereby, the electronic converter unit provides an optimised data flow and an operator may quickly see the highly variable data on the external communication device.

In one embodiment, the electronic converter unit is adapted to be detachably coupled to the pump unit. The unit may for instance be configured to be arranged at a certain position on the housing of the pump unit. This provides a simple way to align detector parts of the electronic converter unit with signal sources of the pump unit.

In one embodiment, the signal source of the pump unit may be a light source, and the first signal detector may be a photo detector for measuring the light emitted from the light source of the pump, wherein the converter unit is adapted to converting optical signals to electrical signals. The second signal detector is an antenna. Thus, optical data is received at the input of the first signal detector and the repeated signal is received at the second signal detector.

In another embodiment, the electronic converter unit comprises an RFID or near-field communication receiver, and a converter unit for converting RFID or NFC signals to electrical signals, as well as transmitting means for transmitting the electrical signals to an external communication unit. The pump unit and converter unit may be set up to automatically communicate via RFID or NFC protocols.

In a highly advantageous embodiment, the converter device is adapted to wirelessly transmit the electrical signals as infrared or as a radio signal, such as GSM, CDMA, 3G, 4G and Bluetooth®.

In an alternative embodiment, a service technician may set the electronic converter unit to operate in signal converter mode or in repeater mode. In other words, the electronic converter unit may be configured to be set to a particular mode based on a manual input. Thereby, the service technician may force the electronic converter unit to operate in a certain mode.

The invention also provides a kit of parts comprising a pump unit, a first electronic converter unit according to any of the aforementioned embodiments configured to operate in signal converter mode, and a number of second electronic converter units according to any of the aforementioned embodiments and configured to operate in signal repeater mode.

The invention further provides a system for checking the operating status of a pump unit, wherein the system comprises: a pump unit, an external communication unit, a first electronic converter unit according to any of the aforementioned embodiments and configurable to operating in converter mode, and at least one second electronic converter unit according to any of the aforementioned embodiments and configurable to operating in repeater mode.

The invention additionally provides a method of communicating between a pump unit and an external communication unit, such as a smart phone, wherein the method comprises the steps of:

arranging a first electronic converter unit external to the pump unit, the first electronic converter unit automatically setting itself to operate in signal converter mode, positioning one or more second electronic converter between the first electronic converter unit and the external communication device, the second electronic converter unit automatically setting itself to operate in signal repeater mode, such that the first electronic converter unit detects signals from the pump unit and converts them to digital telegrams or data packages that are transmitted as electronic signals, and that the second electronic converter unit or units relays the digital telegrams or data packages to the external communication unit.

In one embodiment, the electronic converter unit after being activated inspects a first signal detector input on the unit and if the first signal detector input is idle then switches to signal repeater mode to receive digital telegrams or data packages on the second input input. This provides a simple method for changing between operating modes.

The method and the electronic converter device according to the invention are particular suited for use in balancing heating elements in a heating system. This method for balancing a heating system comprising heating elements and a centrifugal pump is advantageous, where the balancing is made by means of a handheld device such as a smart phone or a tablet and the method being characterized in that an electronic converter unit wirelessly sends information about operational parameters and status parameters of the centrifugal pump to a repeater unit, which repeater unit relays the information to a further repeater or to the handheld device.

Preferably the repeater unit and the electronic converter unit are identical, and comprises means for detecting if a unit must operate as a converter or as a repeater.

In an embodiment said method is further characterized in that the wireless communication between electronic converter and repeater is done with digital telegrams sent in a broadcast mode. Preferably a broadcast mode of the Bluetooth® protocol without any pairing.

In an further embodiment the digital telegrams are prioritized, whereby higher prioritized telegrams containing pump operational parameters (such as actual electrical current or actual flow rate) are sent more frequently by the electronic converter unit than lower prioritized digital telegrams containing pump related parameters which are relatively static (such as pump type, manufacturing year, pump ID).

In the following a number of additional embodiments are described. While the embodiments are directed towards electronic converter units operating in signal converter mode, it is clear that all the embodiments are applicable to a unit, which is configured to operate either as a signal converter or a signal repeater.

According to a first aspect, there is provided an electronic converter unit for a pump unit, wherein the pump unit includes a housing, which comprises a signal source for emitting a signal, wherein the electronic converter unit comprises: a signal detector for measuring the signal emitted from the signal source of the pump unit, and wherein the electronic converter unit is adapted to be detachably coupled to the pump unit and in that the electronic converter unit further comprises:

a converter unit for converting said signals to electrical signals, and transmitting means for transmitting the electrical signals to an external communication unit.

In an advantageous embodiment, the signal source is a light source, and wherein the signal detector is a photo detector for measuring the light emitted from the light source of the pump, and wherein the converter unit is adapted to converting optical signals to electrical signals. However, according to another embodiment, the signal source may also be a sound generator, e.g. a loudspeaker, and the signal detector being a microphone. Further, it is possible to use electrical communication, such as RFID or NFC between the pump and the electronic converter unit.

The invention allows a user or service worker having a handheld communication device, such as a smart phone, to read out information about the operating status from the pump unit. By allowing a converter device and a handheld communication device to access to the pump unit, the necessity of having an expensive user interface provided on the pump unit is further eliminated. Thereby, the production price for the manufacturer and the purchase price for the end consumer may be lowered. In this case the electronic converter unit communicates unidirectionally with the pump unit, and unidirectionally or bidirectionally with the handheld device.

Additionally, if the electronic converter device also acts to provide access to control of the pump unit, the invention provides a secure access to the pump unit, since the user both have to have an electronic converter unit and a handheld communication device with the correct app installed on the handheld communication device. Further, by removing the option to program the pump unit via a control panel, the security of the system is improved and ensures that the pump unit cannot be tampered with or reprogrammed without proper permission. In this case the electronic converter unit communicates bidirectionally with the pump unit, and unidirectionally or bidirectionally with the handheld device.

It is noted that the electronic converter unit is retrofitted to the pump unit and accordingly is a separate device. Accordingly, the electronic converter unit may preferably be detachably coupled to the housing of the pump unit.

The status or operational parameters that can be read out from the pump unit into the electronic converter unit are parameters, such as flow (m3/hour), pressure (meters or bar), electrical current (ampere) used by the motor of the pump or the rotational speed of the rotor and impeller (RPM).

The term "handheld communication device" may cover a number of portable devices of a limited size and may for instance be chosen from the group consisting of: a smart phone, a tablet, a PDA, and a wearable device, such as a smart watch.

The pump unit preferably comprises a pump and an electrical motor. Further, the pump unit may comprise a control box. The pump and electrical motor may be integrated in a common housing, or be separated into a pump housing and a motor housing. The control box (also called terminal box or frontend) may be integrated into one of the housings or it may be a separate unit. The control box may thus be an external unit having a separate housing, and it is recognised that the electronic converter unit may be retrofitted to the housing of the control box. The control box may be arranged at any position of the pump, e.g. in the front or at the side of the pump unit. The control box may include electronics for controlling the pump unit.

The electronic converter unit is adapted to be detachably coupled to the housing of the pump unit. Accordingly, the electronic converter unit may easily be attached and detached from the housing of the pump unit and be used for reading out the operating status from a plurality of pump units.

In one advantageous embodiment, the electronic converter unit is provided with a housing having an aperture, and wherein the photo detector is arranged within the housing behind the aperture. Accordingly, the photo detector of the electronic converter unit may be arranged so that a minimum of surrounding light enters the housing an affects the detection of light emitted from the pump unit.

The photo detector may be arranged in a range of 0.5 mm to 5 mm from the aperture, advantageously in a range of 1 mm to 2.5 mm from the aperture.

The aperture may advantageously be provided with an optical transparent cover, such as glass, artificial glass or plastic, i.e. a window or the like.

In a preferred embodiment, the aperture is further provided with a sheet or layer of conductive material, the sheet having a number of apertures. The apertures ensure that light may pass the sheet or layer of conductive material and be detected by the photo detector.

In another preferred embodiment, the sheet or layer of conductive material is may be an opaque sheet with an aperture for the light to enter, or it may be a mesh structure. Accordingly, the sheet or layer of conductive material may effectively function as a Faraday cage, which allows light to enter but not electrical noise. Accordingly, the electronic converter unit is shielded against interference from a switch-mode converter of the pump unit. The conductive material may for instance be made of metal, such as copper or brass, but any conductive material is in principle applicable. The sheet or layer must provide a closed shielded surface towards the incoming signals incorporating information and electrical noise.

In an advantageous embodiment, a pitch size of the mesh is larger than a wavelength of the transmitted light but smaller than a wavelength of electric noise emitted from the nearby electronic converter unit. The openings in the mesh has to be large enough for light at the wavelength of the light source to be able to be detected by the photo sensor, but small enough to provide an efficient shielding to electric noise.

In one embodiment, the conductive material is integrated into the optical transparent cover. In an alternative embodiment, the optical transparent cover and the sheet of conductive material are provided as two separate layers. Alternatively, the conductive material may be in-moulded or embedded within a transparent cover, i.e. a cover that is transparent to the wavelength of the emitted light from the light sources of the pump unit.

In one embodiment, the conductive material is connected to electrical ground.

In another preferred embodiment, the housing of the electronic converter unit is covered by a conductive material, and the sheet of conductive material is grounded to said housing. The entire interior surface of the housing may for instance be covered by a conductive material, and the aperture be provided with the sheet or mesh of conductive material. Thus, the housing may provide a large ground plane. The conductive material of the housing may also be provided as a mesh structure, thus providing a large Faraday cage.

The electronic circuitry of the electronic converter unit may be grounded to the same ground as the conductive layer of the aperture and the housing. Alternatively, the circuitry may be grounded to a separate ground.

The electronic converter unit is advantageously provided with attachment means for attaching the electronic converter unit to the housing of the pump unit. The attachment means may for instance be chosen from the group of: mechanical fasteners, magnetic fasteners, and adhesive fasteners. The adhesive fastener may for instance be a double-adhesive tape, such as a double-adhesive tape having a layer of foam cells, e.g. acrylic based foam cells. The adhesive is preferably releasable, such that the electronic converter unit may easily be removed from the housing of the pump unit.

In an advantageous embodiment, the fastening means are adapted to align the aperture of the electronic converter unit with the light source of the pump unit. Accordingly, the fastening means may provide an easy relative alignment between the electronic converter unit and the pump unit in order to ensure an efficient readout of light emitted from the pump unit.

In another advantageous embodiment, the electronic converter unit comprises an electronic signal amplification circuit, and optionally further comprises means for shutting off the unit or lowering its energy consumption, if a communication idle-time-limit has been reached.

The invention also provides a pump unit, which includes a housing provided with a signal source for emitting a signal, advantageously indicative of an operating status of the pump, wherein the pump via said signal source is adapted to communicate with an electronic converter unit, which may be detachably coupled to the pump. The signal source may be specially designed for communicating with the electronic converter unit, e.g. having no other purpose.

In an advantageous embodiment, the pump is adapted to communicate with the electronic converter unit via said signal source in near field communication only. Accordingly, the pump may be adapted to communicate with the electronic converter unit only when it is attached to the housing of the pump, or at least arranged in near vicinity of the pump.

In a second aspect, the invention provides a kit of parts comprising a pump unit and an electronic converter unit according to any of the aforementioned embodiments, wherein the pump unit comprises a housing and a signal source, advantageously a light source, for emitting a signal, advantageously light, and further advantageously to display or communicate an operating status of the pump unit, and wherein the electronic converter unit is adapted to be retrofitted to an external part of the housing of the pump unit.

Advantageously, the invention provides a kit of parts comprising a pump unit and an electronic converter unit according to any of the aforementioned embodiments, wherein the pump unit comprises a housing and a light source for emitting light to display an operating status of the pump unit, and wherein the electronic converter unit is adapted to be retrofitted to an external part of the housing of the pump unit.

The light source is accessible from the housing of the pump unit and provides an optical signal indicative of the operating condition of the pump unit.

While a simple diode display may provide a simple visual indication to a user, e.g. green light for correct operating conditions and red light for faulty operating conditions, it is difficult to extract more detailed information about the operating condition of the pump. The invention provides a simple system, where a retrofitted device may be used for extracting such information from a simple light display, such as a diode display comprising only a limited number of diodes. Thereby, the necessity of having an expensive user interface or display provided on the unit is eliminated. Thereby, the production price and the purchase price for the end consumer may be lowered. The optical signal may be provided as a simple binary signal or the like.

The pump unit may comprise an electric motor and at least one rotating shaft. The pump unit may display an operational state of the pump unit by use of the light source. The operational state may comprise information about the electric motor and the at least one rotating shaft, e.g. the current rotational speed of the shaft.

The pump unit may further be provided with a receiver for receiving instructions from the electronic converter unit, and wherein the electronic converter unit is provided with a transmitter for transmitting instructions to the pump unit. Accordingly, the converter unit may provide two-way communication and act as an intermediate communication device, which enables an external communication device to receive and transmit information between the external communication device and the pump unit and inter alia to control the pump unit. This provides a highly secure system, where a user can only access the working parameters of the pump system, if the user both have to have an electronic converter unit and a handheld communication device with the correct app installed on the handheld communication device.

The pump unit may comprise an electronic switch-mode converter or power supply, e.g. operating in the frequency range of 100 kHz to 200 kHz.

In a third aspect, a system for checking the operating status of a pump unit is provided, wherein the system comprises a pump unit, an external communication unit, and an electronic converter unit, wherein the pump unit comprises a housing and a signal source, advantageously a light source, for emitting a signal, advantageously light, and further advantageously to display an operating status of the pump unit, and wherein the electronic converter unit is adapted to be retrofitted to an external part of the housing of the pump unit and adapted to convert signals from the pump unit to electrical signals and to transmit the electrical signals to the external communication unit, and wherein the external communication unit is adapted to receive and process electrical signals sent from the electronic converter unit so as to display the operating status of the pump unit on a display of the external communication device.

In the third aspect, a system for checking the operating status of a pump unit is provided, wherein the system comprises a pump unit, an external communication unit, and an electronic converter unit according to any of the aforementioned embodiments, wherein the pump unit comprises a housing and a light source for emitting light to display an operating status of the pump unit, and wherein the electronic converter unit is adapted to be retrofitted to an external part of the housing of the pump unit, and wherein the external communication unit is adapted to receive and process electrical signals sent from the electronic converter unit so as to display the operating status of the pump unit on a display of the external communication device.

In other words, the external communication device may be provided with a receiver for receiving electrical signals sent from the electronic converter unit, and a processing unit for processing the electrical signals received.

In one advantageous embodiment, the external communication device is further adapted to control the pump unit via the electronic converter unit. Accordingly, the electronic converter unit may provide a two-way communication between an external communication device and a pump unit.

In a fourth aspect, a method for checking the operating status of a pump unit with an external communication unit is provided, wherein the method comprises the steps of:

a) providing a pump unit comprising a housing and a light source for emitting light to display an operating status of the pump unit, b) arranging an electronic converter unit for converting an optical data output from the light source of the pump unit to an electrical data signal so that a photo detector of the electronic converter unit is aligned with the light source of the pump unit, c) the pump unit emitting the optical data output via the light source in order to display the operating status of the pump unit, d) the electronic converter unit detecting the optical data output via the photo detector, e) the electronic converter unit converting the detected optical data output to an electrical data signal, f) the electronic converter unit transmitting the electrical data signal to the external communication device, g) the external communication device processing the electrical data signal in order to extract the operating status of the pump unit, and h) the external communication device displaying the operating status of the pump unit on a display of the external communication device.

Thereby, a simple method of reading out and displaying the operating status of a pump unit via an external communication device running a software application (an app) is provided. Thus, the pump unit does not need to be provided with a large display screen.

As previously mentioned, the design may also more broadly refer to a general signal source and a corresponding detector, e.g. a sound generator and microphone or an RFID or NFC signal source and an RFID or NFC receiver.

In an advantageous embodiment, the pump unit in a subsequent step is controlled by:

i) the external communication device sending instructions to the pump unit, and j) the pump unit setting driving conditions of the pump unit based on said instructions.

Accordingly, a two-way communication is established between the external communication device and the pump unit, which may thus be controlled or operational parameters may be changed via the app on the external communication device.

Preferably, the instructions are sent to the electronic converter unit, which converts the instructions and emits the converted instructions via a light source of the electronic converter unit, which in turn is received by a photo detector on the pump unit. Thus, the electronic converter unit provides the two-way communication. Accordingly, a highly secure system is provided, where the settings of the pump unit may only be changed, if the user has an electronic converter unit and is running the correct app on the external communication device.

In one embodiment, the operating status received from the electronic converter unit and displayed on the handheld device is chosen from the group of: a flow information, a speed information, an electrical current information or a pressure information relating to the liquid flowing in pipes connected to the pump, a temperature of the liquid, a rotational speed of a shaft of the pump unit, and wherein said information is optionally used by an app in the handheld device to guide a service technician to balance said liquid flow or pressure in a heating system comprising a plurality of radiators or heat radiating pipes.

In a first additional aspect, an electronic converter unit for a pump unit is provided, wherein the pump unit includes a housing and comprises a communication system for transmitting an operating status of the pump unit, wherein the communication system comprises an RFID or near-field communication (NFC) unit, and wherein the electronic converter unit is adapted to be retrofitted to an external part of the housing of the pump unit and in that the electronic converter unit comprises:
  a RFID or near-field communication receiver,
  a converter unit for converting RFID or NFC signals to electrical signals, and
  transmitting means for transmitting the electrical signals to an external communication unit.

The only difference between the first aspect and the first additional aspect is that the technology for the retrofitted electronic converter is based on RFID or NFC technology instead of an optical readout or display from the pump unit. All the afore-mentioned embodiments are also applicable to the first additional aspect.

According to a second additional aspect, a kit of parts is provided, wherein the kit of parts comprises a pump unit and an electronic converter unit to be retrofitted to the housing of the pump unit, and wherein the communication is based on RFID or NFC technology.

According to a third additional aspect, a system for checking the operating status of a pump unit is provided, wherein the system comprises a pump unit, an external communication unit, and an electronic converter unit, wherein
  the pump unit comprises a housing and a communication system for transmitting an operating status of the pump unit, wherein the communication system comprises an RFID or near-field communication (NFC) unit, and wherein
  the electronic converter unit is adapted to be retrofitted to an external part of the housing of the pump unit and adapted to convert RFID or NFC signals from the pump unit to electrical signals and to transmit the electrical signals to the external communication unit, and wherein
  the external communication unit is adapted to receive and process electrical signals sent from the electronic converter unit so as to display the operating status of the pump unit on a display of the external communication device.

The communication between the pump unit and the electronic converter unit may for instance be based on induction coils or loop antennas.

The systems utilising optical readout and the RFID or NFC based communication are linked by a common inventive concept in that the display of the pump unit may be simplified and in that a retrofitted electronic converter unit is utilised to convert the output from the pump unit, which may also provide additional improved security aspects.

BRIEF DESCRIPTION OF THE FIGURES

The invention is explained in detail below with reference to embodiments shown in the drawings, in which.

DETAILED DESCRIPTION OF THE INVENTION

Figure 1:
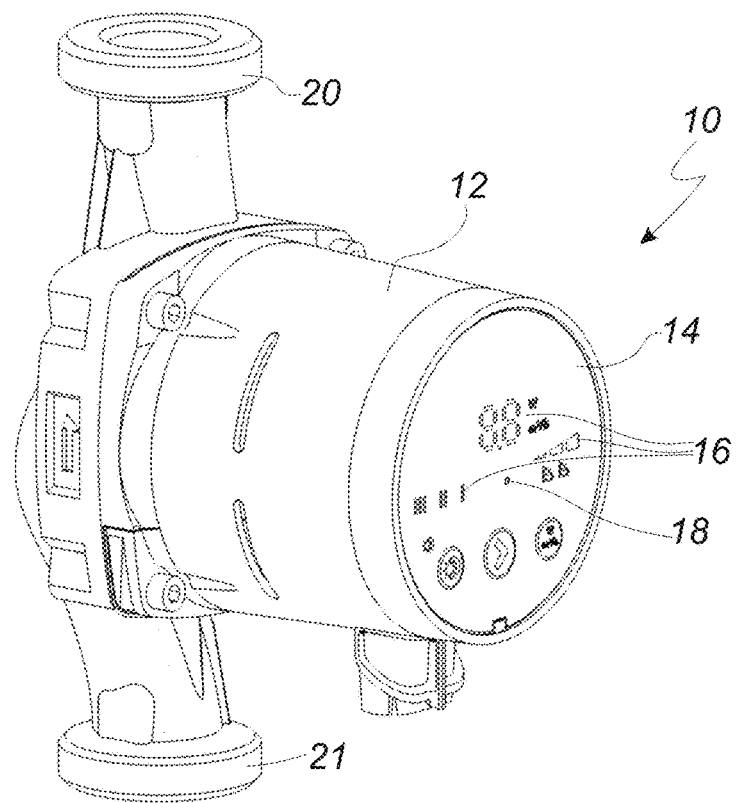
FIG. 1 shows a perspective view of a pump unit.

FIG. 1 shows a perspective view of a pump unit 10 or pump assembly. The pump unit 10 comprises a housing 12 or terminal box, which has a front end 14 or display, which may be provided with a number of display units 16, which may provide a simple indication of an operating status of the pump unit. However, the invention also makes it possible to simplify the front end 14 even further, as the necessity of having a display is alleviated, whereby the production cost and thereby the price for the end-consumer may be lowered considerably. Accordingly, the front end 14 may be provided without the display units 16. The front end 14 is further provided with a light source 18, e.g. in form of a single photo diode or a plurality of photo diodes. The pump unit 10 is under operation installed in a pipe system via the pipe flanges 20, 21.

The housing 12 or terminal box of the pump unit 10 houses an electrical motor and a drive shaft as well as control circuitry of the pump unit 10. In the depicted embodiment, the electric motor and pump parts are integrated into a common housing. However, in an alternative embodiment, the electrical motor and the pump may be arranged in separate housings. The control circuitry may control the light source 18 to emit light to display an operating status of the pump unit 10, whereby more detailed information about the operating status may be read out from the pump unit 10, e.g. as binary optical signals.

The front end 14 of the pump unit 10 may further be provided with one or more buttons, which may be pressed in order to initialise a sequence, where the light source 18 is brought to emit light in order to display the operating status of the pump unit 10.

Figure 2:
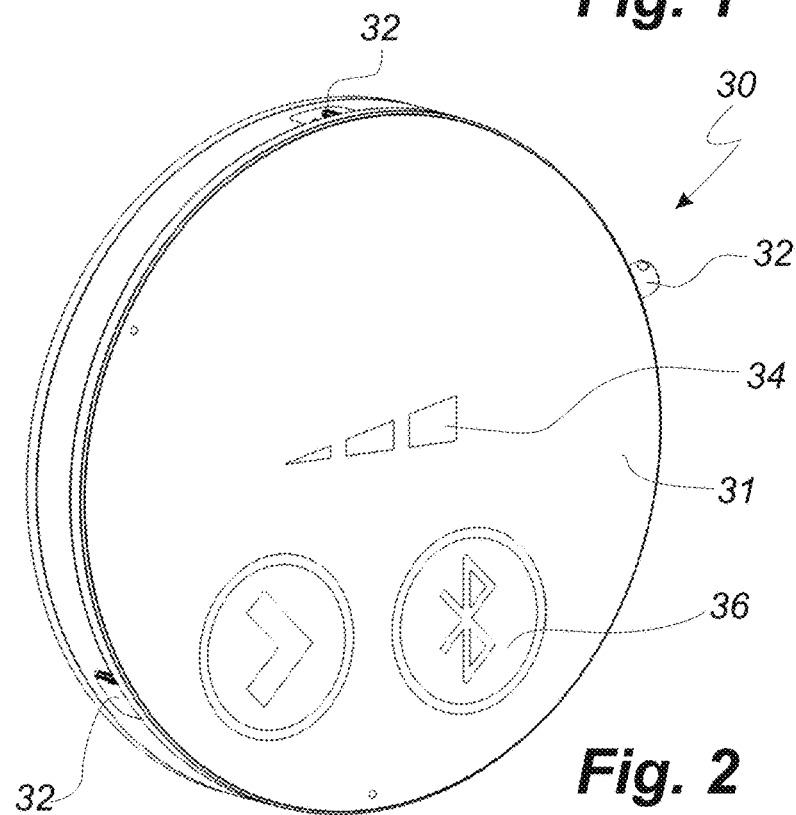
FIG. 2 shows a perspective view of an electronic converter unit according to the invention.

FIG. 2 shows a perspective view of an electronic converter unit 30 according to the invention. The electronic converter unit 30 comprises a housing 31, which houses the electronic circuitry of the electronic converter unit 30. The electronic converter unit 30 is adapted to be attached or retrofitted to an external part of the housing 12 of the pump unit 10, preferably adapted to being detachably coupled to the housing 12 of the pump unit 10. The electronic converter unit 30 is shown as a circular shaped device, but can also have the shape of a rectangular box. For reasons of handiness, the outer contour of the unit 30 is smaller than the contour of the front end 14.

The electronic converter unit 10 comprises a photo detector (not shown in FIG. 2) for detecting light emitted from the light source 18 of the pump unit 10, and which is arranged on or near a side of the electronic converter unit 30, which when attached to the housing 12 of the pump unit 10 faces towards the housing 12 of the pump unit 10.

The electronic converter unit 30 may further comprise a number of attachment parts 32, e.g. in form of retractable mechanical fasteners (not shown in FIG. 2). A front end of the electronic converter unit 30 may further be provided with an indicator or display 34, e.g. for giving an indication of a signal strength of the measured optical signal emitted from the light source 18 of the pump unit 10. The display 34 may thus provide a visual feedback to a user providing information about the alignment of the photo detector relative to the light source 18 of the pump unit 10.

In one embodiment, the front end 14 does not contain the light source 18. Instead, display units 16, i.e. segmented light emitting diodes, act as the signal source. The segments can be turned on or off in a predetermined pattern that can be read and interpreted by the electronic converter unit 30.

The electronic converter unit 30 is further provided with a communication unit for converting the detected optical signal to an electrical signal, such as infrared or a radio signal, e.g. based on GSM, CDMA, 3G, 4G, and Bluetooth® 36.

The front end of the electronic converter unit 30 may be provided with one or more buttons to initialise a sequence, where the electronic converter unit 30 detects optical signals emitted from the light source 18 of the pump unit 10 and converts the optical signals to electrical signals and transmits the electrical signals to an external communication unit, such as a smart phone.

Figure 3:
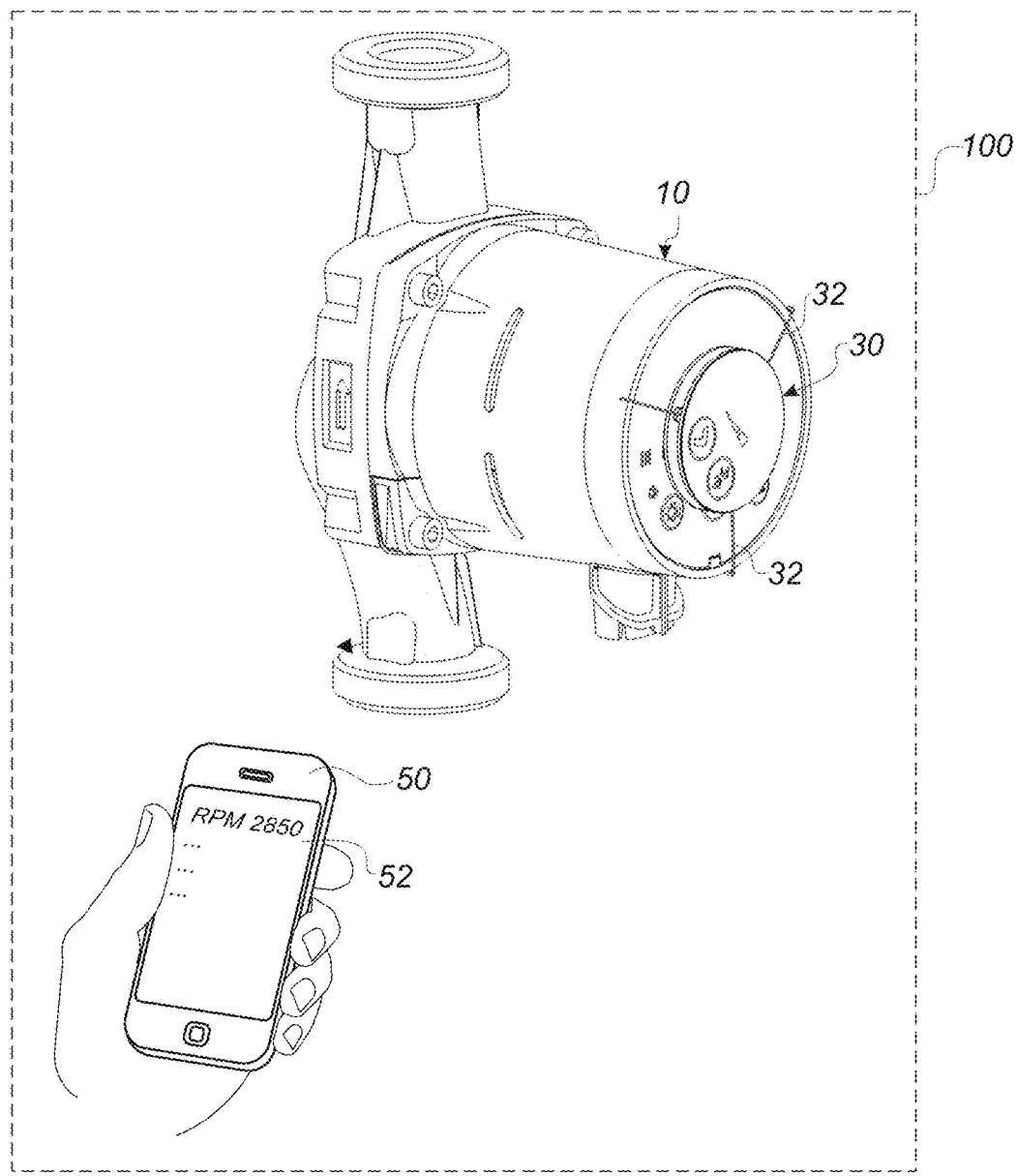
FIG. 3 shows a perspective view of the electronic converter unit retrofitted to an exterior part of a housing of the pump unit.

FIG. 3 shows a system 100 for checking the operating status of a pump unit 10. The system 10 comprises the afore-mentioned pump unit 10 and the electronic converter unit 30. The electronic converter unit 30 is here shown attached to the front end 14 of the housing 12 of the pump unit 10, such that the photo detector of the electronic converter unit 30 is aligned with the light source 18 of the pump unit 10. The electronic converter unit 10 is attached to the front end 14 of the pump unit 10 by use of mechanical fasteners 32, which are connected to sides of the housing 12 of the pump unit 10.

The electronic converter unit 10 detects the optical signals emitted from the pump unit 10 and converts them to radio signals, which are transmitted to an external communication unit 50 in form of a smart phone having a display 52. The smart phone 50 comprises an app, which is installed and running on the smart phone 50. The smart phone 50 and app are adapted to receive and process the radio signals sent from the electronic converter unit 30 so as to display the operating status of the pump unit 10 on the display 52 of the smart phone 50. The app may further be provided with a function to control the pump unit by setting the operating or drive parameters of the pump unit 10. The smart phone 50 may send the control instructions via the electronic converter unit 30.

FIGS. 8*a*-*d* show an alternative design for an electronic converter unit 30' for use in the invention, where the electronic converter unit 30' is shaped as an elongated unit. The electronic converter unit 30' comprises the same features as the electronic converter unit shown in FIG. 2. Accordingly, only the differences between the two embodiments are described in the following. Similar to the embodiment of FIG. 2, the electronic converter unit 30' comprises a housing 31', which houses the electronic circuitry of the electronic converter unit 30'. A front end of the electronic converter unit 30' may further be provided with an indicator or display 34', e.g. for giving an indication of a signal strength of the measured optical signal emitted from the light source 18 of the pump unit 10. The display 34' may thus provide a visual feedback to a user providing information about the alignment of the photo detector relative to the light source 18 of the pump unit 10.

Figure 8A:
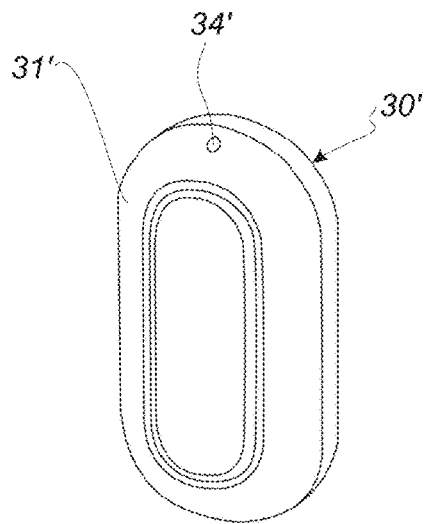
FIGS. 8a-d show perspective views of an alternative design for the electronic converter unit according to the invention.
Figure 8B:
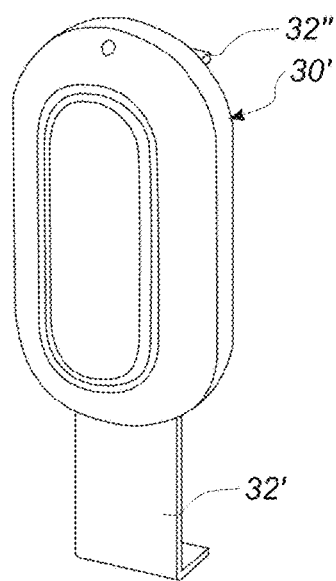
Figure 8C:
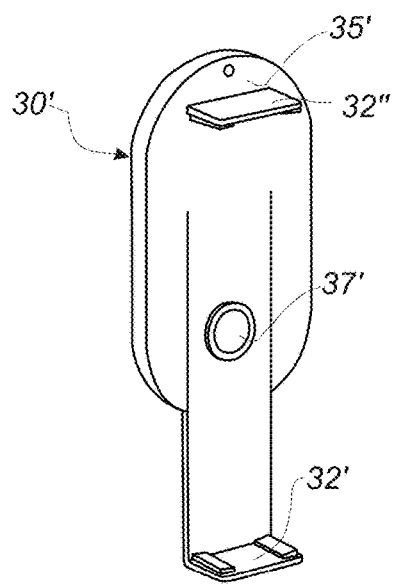

The electronic converter unit 30' comprises a first mechanical fastener 32', which may advantageously be slidable engaged with a main part of the electronic converter unit and may be extended from a first end of the electronic converter unit 30'. The electronic converter unit 30' further comprises a second mechanical fastener 32" at a second end of the unit 30'. The distance between the two mechanical fasteners 32', 32" may be varied so that they can mechanical engage sides of the frontend of the pump unit 10. The electronic converter unit 30' may further be designed such that the first mechanical fastener 32', when arranged in a closed state, covers and protects an aperture (e.g. a window or a condensing lens) in front of a photo detector of the electronic converter unit, and so that the aperture is exposed, when the first mechanical fastener 32' extends from the main body of the unit 30' (as seen in FIG. 8*c*). The mechanical fasteners 32' and 32" may be provided with small rubber pads, placed in the area where they engage with the pump housing. In this way the electronic converter unit 30 is mechanically better fixated to the pump housing and accommodate the shape of the housing.

Figure 8D:
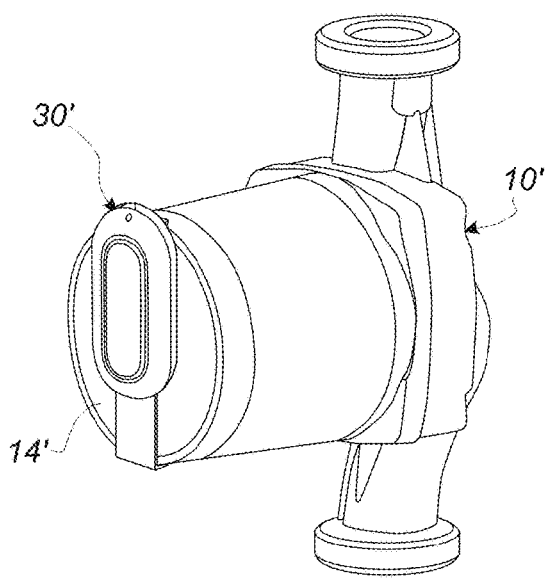

The electronic converter unit 30' may further be designed such that a small part 35' of the unit 30' protrudes beyond the housing of the pump unit 10, when the electronic converter unit 30' is arranged on the front end 14 of the pump unit, as shown in FIG. 8*d*. This may for instance be achieved by letting the second mechanical fastener 32" being spaced slightly from an end face of the unit 30'. An antenna may be arranged in the protruding part 35' of the electronic converter unit 30', which may in some instances provide a stronger signal to the handheld communication device.

Figure 4:
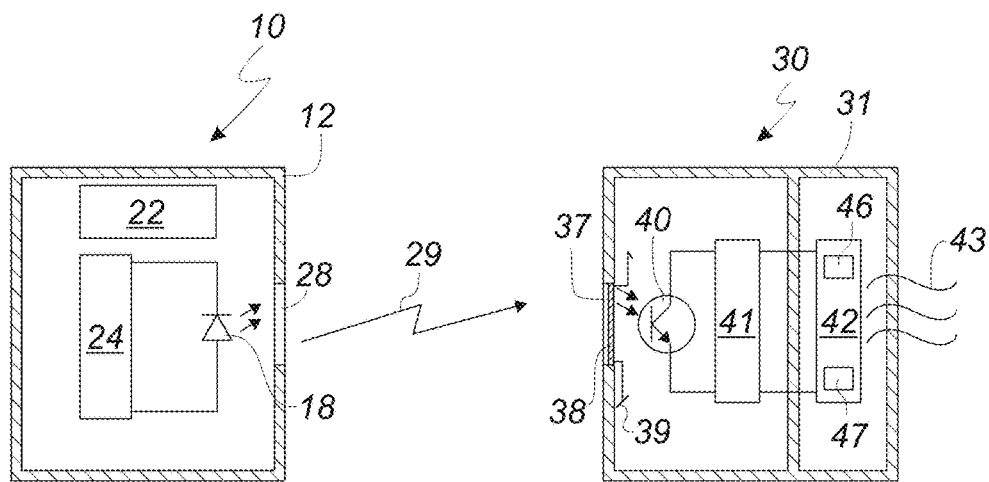
FIG. 4 shows a schematic drawing of components of the electronic converter unit and the pump unit.
Figure 5:
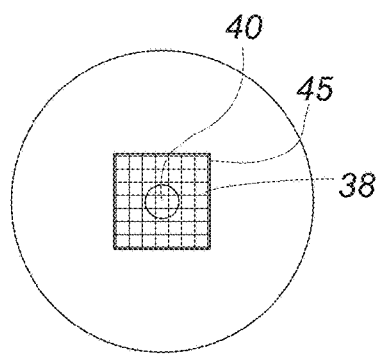
FIG. 5 shows a schematic drawing of an aperture provided in a housing of the electronic converter unit.

FIG. 4 shows a schematic drawing of components of the pump unit 10 and the electronic converter unit 30, and FIG. 5 shows a part of the side of the electronic converter unit 30, which faces towards the housing 12 of the pump unit 10, when the electronic converter unit 30 is attached to the pump unit 10. The electronic converter unit may for instance correspond to the embodiment of FIG. 2 or FIG. 8.

As previously mentioned, the housing 12 of the pump unit comprises a control circuitry. The control circuitry comprises a control unit 24, which controls the emission of light from the light source 18, and which may be instructed to read out the operational status of the pump unit 10 via optical signals 29 or optical data transmitted from the light source 18. The light source 18, e.g. in form of one or more photo diodes may be accessible from the housing 12 of the pump unit 10, or it may be arranged behind a window 28. In the preferred embodiment the transmission speed of the diode is 9600 baud.

The control circuitry further comprises a switch-mode converter or power supply, which comprises a frequency transformer 22. The switch-mode converter may for instance be operating in the frequency range of 100 kHz to 200 kHz and may be the source of electrical noise from the pump unit 10.

The housing 31 of the electronic converter unit 30 also comprises an electronic circuitry. The electronic circuitry comprises a first signal detector 40 embodied as a photo detector, e.g. in form of a photo transistor or photo diode, which is connected to a communication unit 41 for detecting and converting the detected optical signal 29. The electronic circuitry further comprises a Bluetooth® unit 42, such that the detected signal may be transmitted as a wireless signal transmission 43 to the external communication device 50 via the Bluetooth® protocol. Bluetooth® unit 42 comprises an antenna 46, which is used for transmitting a converted signal from the communication unit 41, but also used for receiving airborne signals from outside. Antenna 46 is used as the second signal detector of the electronic converter unit 30. The software of the electronic converter unit can be updated by way of antenna 46. Alternatively, instead of using antenna 46 for both receiving and transmission of radio frequency signals a separate transmission antenna 47 could be built into unit 30. Thus the electronic converter unit 30 has two input channels, namely a first receiving channel for receiving optical input and a second receiving channel for receiving airborne electrical signals. The first receiving channel has an low frequency input range between 1 Hz and 1 MHz, and the second receiving input based on antenna technology has a high frequency input range between 100 MHz and 3 GHz. The transmitter or Bluetooth® unit 42 of the electronic converter unit 30 may also use other conventional communication protocols, such as GSM, CDMA, 3G, 4G, or infrared light.

In order to ensure a longer reach of the wireless signal 43, an electronic amplifier (not shown) increases signal strength. This is relevant for the application of the invention in buildings, where walls separate the electronic converter unit 30 from the handheld device 50. Signal 43 should also reach the handheld device of the service technician from the cellar, even if he is on the third floor. An energy supply (not shown), preferably in the form of batteries, are included in the electronic converter unit 30. They supply 40, 41 and 42 with electrical energy. As converter unit 30 in the preferred embodiment is a stand-alone unit supplied by batteries only, energy saving is important. In order to save energy, the energy supply is shut off, or lowered in the level of supply energy, if detector 40 does not receive an optical signal, or if a transmission-idle-time-limit has been reached, e.g. 30 seconds. In one embodiment, instead of using batteries, energy can be supplied by the pump unit itself to the electronic converter unit. This can be achieved by wireless and inductive energy transfer from a coil placed behind the front end 14, said coil then inductively energises a coil placed inside the housing 31 of electronic converter unit 30.

The photo detector 40 is arranged behind an aperture 45 in the housing 31 of the electronic converter unit 30. The aperture may be provided with an optical transparent layer 37, e.g. made of glass, artificial glass, or plastic, and further a conductive layer 38, which is provided with an aperture to allow light to enter and be detected by the photo detector 40. The aperture may also comprise a condensing lens or a Fresnel lens in order to ensure that the light from the pump unit 10 reaches the photo detector 40. The conductive layer 38 is preferably formed as a mesh structure or an opaque layer with an aperture, such that the conductive layer 38 provides a Faraday cage like mesh structure, which allows light to enter but not electrical noise or interference. The Bluetooth® unit 42 is arranged outside the Faraday cage so that it is able to send the converted signal to the external communication device 50.

The optical transparent layer 37 and the conductive layer 38 may be provided as two separate layers as shown in FIG. 4, or they may be integrated into a single layer.

The aperture 45 is shown as being substantially square. However, it may be of any suitable shape, e.g. being round.

The conductive layer 38 is preferably connected to ground 39. The internal part of the housing 31 of the electronic converter device 30 may also be covered by an electric conductive layer, e.g. also in form of a mesh structure. The conductive layer or mesh structure 38 may then be grounded to the conductive layer of the housing, which provides a large ground plane.

The conductive material of the conductive layer and the interior of the housing 31 may for instance be made of metal, such as copper or brass, but any conductive material is in principle applicable.

The electronic circuitry is preferably also connected to ground. The conductive layer 38 and the electronic circuitry may be connected to a common ground or to separate grounds.

Figure 6A:
FIGS. 6a and 6b show detected signals without and with noise reduction, respectively.
Figure 6B:
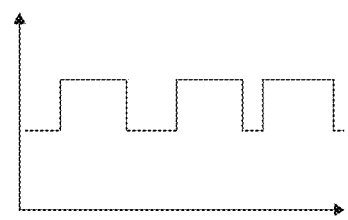

FIGS. 6a and 6b illustrate detected signals without and without the mesh structure provided in the aperture 45, respectively. As seen in FIG. 6a, the detected signal is very noisy, if the aperture is not provided with an electrical conductive mesh structure. Thus, the noise may influence the conversion of the detected optical signal 29 to the radio signal transmission 43. However, by utilising a mesh structure in the aperture 45, the electrical noise may be removed and the optical readout may be converted by detector 40, e.g. to clear binary signal as shown in FIG. 6b.

Figure 7:
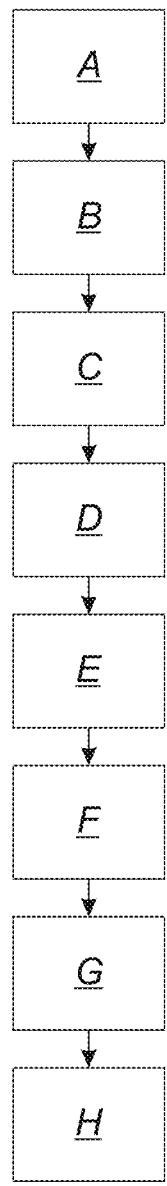
FIG. 7 illustrates the steps in a method for checking the operating status of a pump unit on an external communication unit.

FIG. 7 illustrates the steps in a method for checking the operating status of the pump unit 10 on the external communication unit 50.

In a first step (A), the pump unit 10 is provided. Then in a second step (B), the electronic converter unit 30 for converting an optical data output from the light source of the pump unit to an electrical data signal is arranged on the housing 12 of the pump unit 10 so that the photo detector 40 of the electronic converter unit 30 is aligned with the light source 18 of the pump unit 10.

Figure 9:
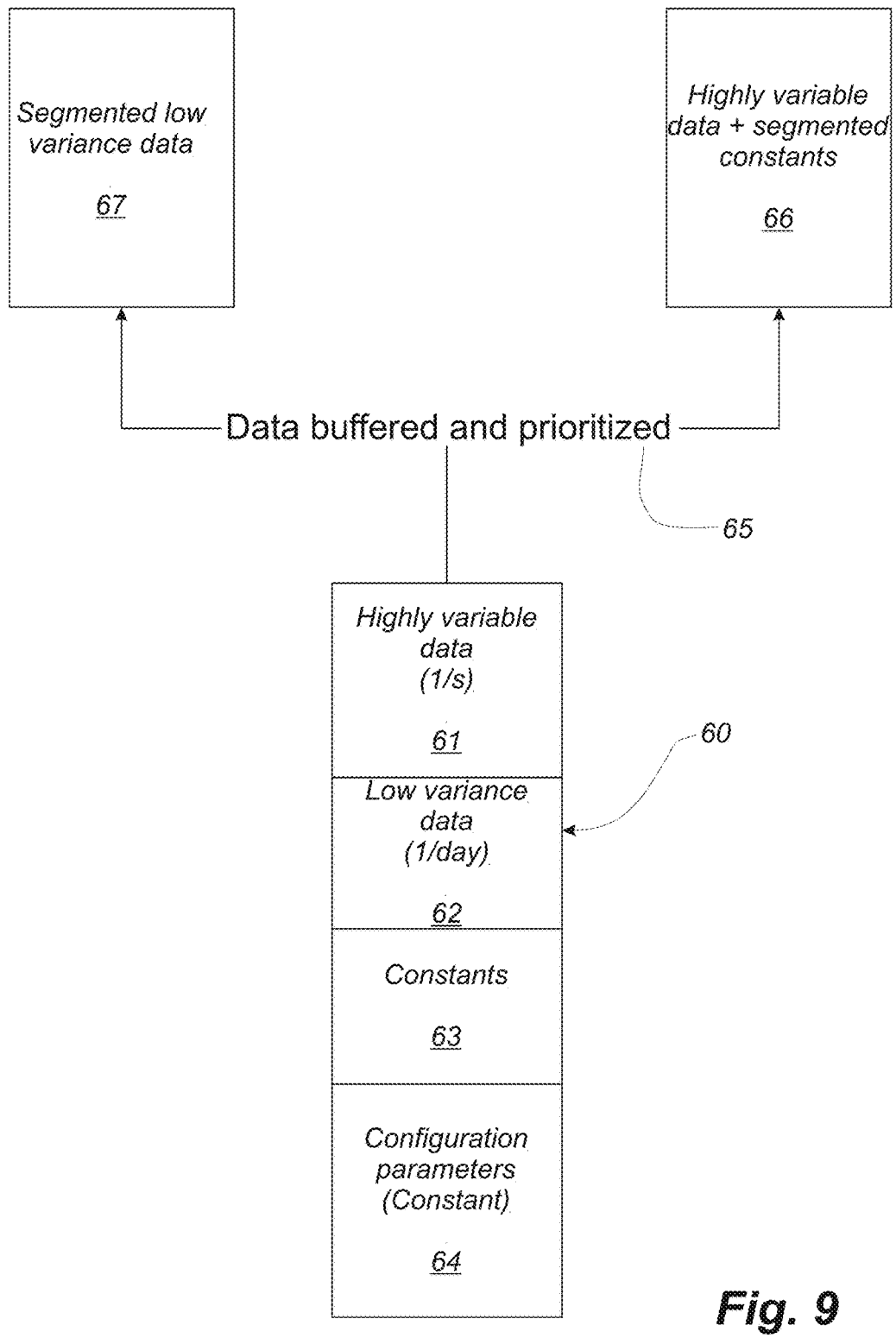
FIG. 9 shows data communication according to the invention from the pump unit and data handling by the electronic converter unit.

In a third step (C), the pump unit 10 is brought to a state, where an optical data output is emitted via the light source 18 in order to read out the operating status of the pump unit 10. The control unit 24 inside the pump housing 12 sends a data package containing 100 bytes. These 100 bytes are sent in one continuous stream of data, which incorporates relevant information about the pump and its operational status. More precisely the data package contains three types of information namely non-varying or constant information as e.g. pump type or serial number of the pump (pump ID), seldomly varying information and frequently varying information. Frequently varying information is information like pressure in a pipe, liquid flow rate, electrical power or current consumed by the pump motor or rotational speed of the impeller of the pump. FIG. 9 shows in position number 60 the 100 bytes data package sent from pump diode 18 to the electronic converter unit 30. The data package contains the frequently varying data 61, seldomly varying data 62, and two types of constant data 63 and 64. The 100 bytes are updated every second and the transmission time from pump to electronic converter unit 30 is 100 milliseconds.

In a fourth step (D), the electronic converter unit 30 detects the optical data output via the photo detector 40.

In a fifth step (E) of FIG. 7, the electronic converter unit 30 converts the optical data output to an electrical data signal. In FIG. 9 this is shown with the text "Data buffered and prioritized", pos. no. 65. In this step E, the communication unit 41 of the electronic converter unit 30 re-arranges the data from the 100 bytes data package into a number of telegrams. These telegrams, once finished, are to be transmitted wirelessly from the electronic converter unit to the outside world. More specific a total of four telegrams are formed. One telegram is a so-called "initial telegram", which is sent immediately after the converter unit 30 is activated. This telegram informs smart devices, such as smart phones, in the vicinity that the converter unit 30 has arrived on the scene and establishes contact. Another telegram type contains information about the Bluetooth® address. The last two of the four telegrams contain the operational information from the pump. These two telegrams are shown in FIG. 9 with numbers 66 and 67. Telegram 66 contains those pump and process parameter values that change frequently, e.g. the electrical current of the motor of the pump, or the rotational speed of the impeller. Telegram 67 contains data which are not so frequently updated in the pump. The electronic converter unit first takes the highly variable data shown in 61 of FIG. 9 and transmits them in telegram 66. As the telegram length is limited by the Bluetooth® protocol to 31 bytes it may be that not all of the highly variable data in 61 are collected and sent in the first telegram 66. Therefore a second telegram 66 may be sent and this time maybe also containing data from the low variance data section 62. Thus, the electronic converter unit selects portions of the signal from the pump unit and allocates the selected portions either to telegrams to be sent frequently or to telegrams to be sent less frequently.

In a sixth step (F) of FIG. 7, a signal transmission 43 to the external communication device 50 takes place. Using the Bluetooth® protocol the transmission frequency is 2.4 GHz, e.g. via Bluetooth Core Specification 4.0 or 4.1 (also called Bluetooth® smart). The transmission mode is the broadcast mode meaning that communication unit 30 sends out the telegrams without establishing pairing or a bidirectional communication link between unit 30 and smart phone 50. Instead, it is a unidirectional communication. The telegrams have a length of 31 bytes. The electronic unit 30 sends out ten telegrams per second which obviously is more than needed because the pump only updates data every one second. However, tests have shown that the app on the receiving smart phone 50 is perceived slow by the user, if telegrams are sent only once per second. The telegram 66 with frequently varying data is broadcasted more frequently than the telegram with seldomly varying data. This is important in time critical applications, where fast update is needed. Thus, the telegrams formed by the electronic converter unit 30 are prioritized and telegrams with frequently changing data are sent more frequently than telegrams with seldom changing data. In the concrete example at hand low variance data telegram 67 of FIG. 9 is sent every sixth second, whereas the telegram with highly variable data 66 is sent ten times a second.

In a seventh step (G), the external communication device 50 processes the received electrical data signal via an app installed and running on the external communication device 50 and extracts the operating status of the pump unit. In an eighth step (H), the external communication device 50 displays the operating status of the pump unit and the display 52 of the external communication device 50.

In the previous, the system and method according to the invention have been described in relation to embodiments for reading out the operational status of the pump unit 10. However, the pump unit 10 may further be provided with a receiver for receiving instructions from the electronic converter unit 30, and the electronic converter unit 30 may be provided with a transmitter for transmitting instructions to the pump unit. The pump unit may in one embodiment be equipped with a CCD device on the front end 14, and electronic processing devices inside the pump unit would then perform digital image processing. In a more cost efficient version, a photo detector like detector 40 may be placed in front end 14 instead. Accordingly, the electronic converter unit 30 may provide two-way communication and act as an intermediate communication device, which enables the external communication device 50 to receive and transmit information between the external communication device 50 and the pump unit 10 and inter alia to control the pump unit 10. This provides a highly secure system, where a user can only access and control the working parameters of the pump unit 10, if the user both have an electronic converter unit according to the invention and e.g. a smart phone 50 with the correct app installed on the smart phone 50.

In one embodiment, the invention is used in a method for balancing the fluid flow and/or fluid pressure in the pipes of a heating system, such as a system with a plurality of parallel radiators, or parallel heating tubes for floor heating. In a known manner, the service technician detects an unbalance in the system, and adjusts for example the flow through a radiator by adjusting a valve on the radiator. In this way a radiator, which receives too high flow, experiences a reduced flow due to the adjustment of the valve, and the other radiator(s) receive more flow. Balancing is a way to obtain better heating comfort for the homeowner, and a way to reduce energy consumption. When performing a balancing of a heating system, the service technician can advantageously use the current invention. When commissioning the heating system in a house, or when later performing maintenance on the system, the service technician places the electronic converter unit 30 on the front end 14 of the pump. He initializes the converter unit 30 to read out the flow and/or pressure through the pump and leaves the site of the pump and goes to the radiators, e.g. on the $3^{rd}$ floor of the house. When adjusting the valve of a radiator the adjusted value of flow and/or pressure can be read in the display of the handheld device 50. Based on this information the service technician can perform an easy balancing of the system. Preferably, the handheld device includes an app, which is dedicated to assist the service technician in balancing heating systems. The dedicated balancing app instructs the service technician about the steps to be taken when performing balancing and also includes calculation algorithms for calculating optimum heating and energy conditions. In a first step, the service technician informs the app about the number of radiators. In a second step he closes all radiators, i.e. shuts off the valves, except for one radiator. The electronic converter unit 30 then reads the flow and/or pressure through the pump, and informs the handheld device, or more precisely the app of the handheld device. The app stores this information. In the next step, the radiator just measured is closed, and another radiator is opened. The electronic converter unit makes a new reading and sends this to the app in the handheld device. This closing-opening process is repeated until all radiators have been measured, and the most inefficient radiators have been identified by the app. The app will then inform the service technician about which radiator is to be adjusted. Instead of sending information about flow or pressure, information about the electrical current of the pump can also be sent.

Figure 10:
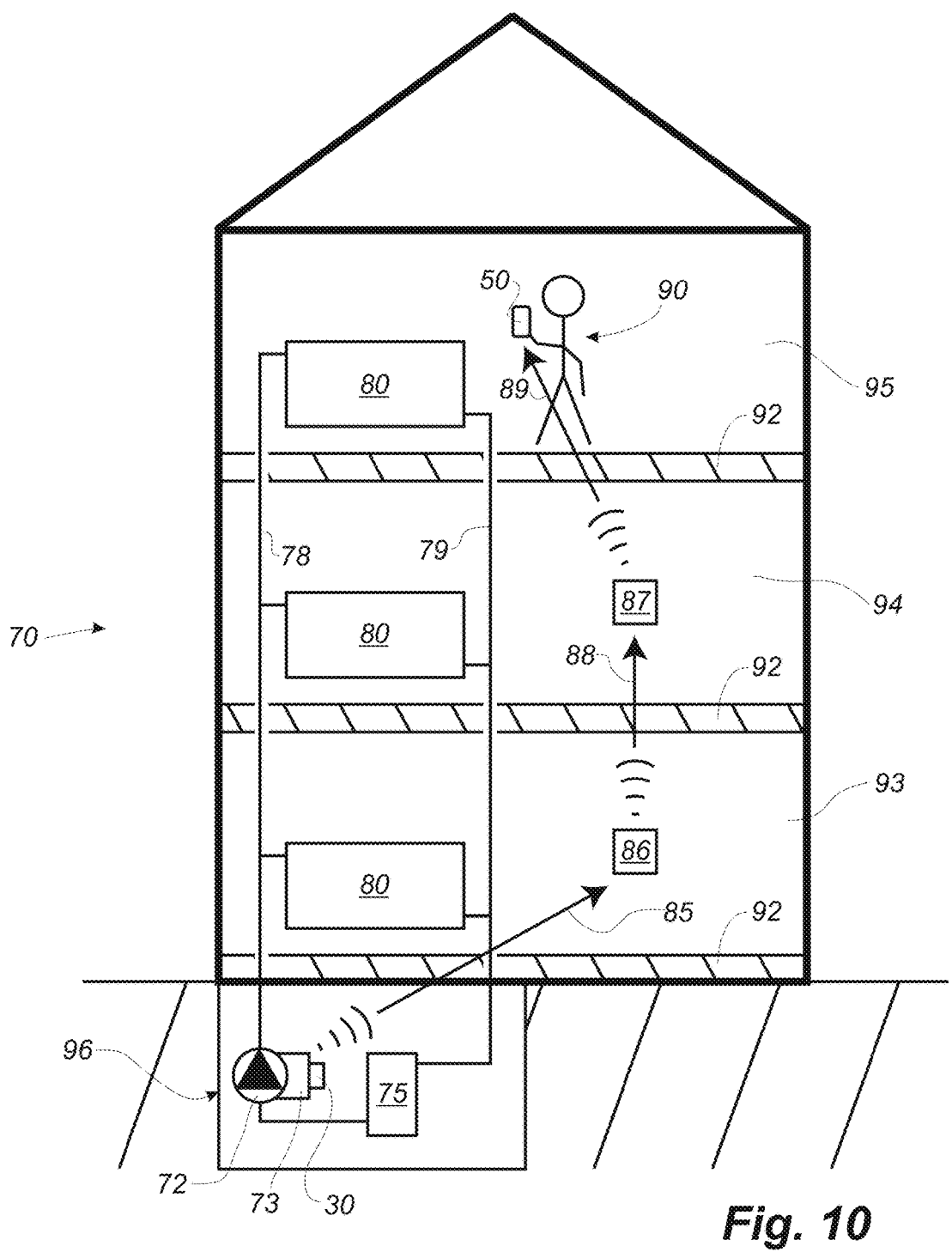
FIG. 10 shows the inventive electronic converter unit used for balancing a heating system in a house

Turning to FIG. 10, an embodiment of the invention is shown. A house 70 comprises three storeys 93, 94 and 95 and a heating system. The heating system comprises a centrifugal pump 72 controlled by a pump controller placed inside housing 73. An electronic converter unit 30 is placed on the housing of the pump controller and communicates via optical signals as already described. A boiler 75 feeds hot water via pump 72 and pipes 78 and 79 to and from radiators 80. The boiler 75 and the centrifugal pump 72 may for instance be installed in a basement 96 of the house 70.

A service technician 90 reads a radiator balancing app in his handheld device 50, where he can see pump parameter values and be guided into a correct balancing of the radiators. Concrete floors 92 between the storeys 93, 94 and 95 of the house are dampening the signal strength of the Bluetooth® signal 85 sent from the electronic unit 30. In order to avoid the weakening of the signal to the smart phone 50, a repeater 86 is placed in storey 93. The repeater reads the signal 85 and relays it to the next repeater 87 at floor 94. This repeater relays the signal as signal 89 to the smart phone 50. The repeaters 86 and 87 are identical copies of electronic converter unit 30. This means that repeater 86 and 87 can be interchanged freely with unit 30 and be mounted on the pump controller 73. Using identical devices for mounting on the pump and for use as a repeater gives large advantages for the manufacturer. Also, the customer and user of such a communication system will not have to learn to products but can stay with one. Once the service technician has switched the repeaters 86, 87 on and placed them in places, where the signals 85 and 88 can be unhindered received, the electronic unit 30 is switched on.

Figure 11:
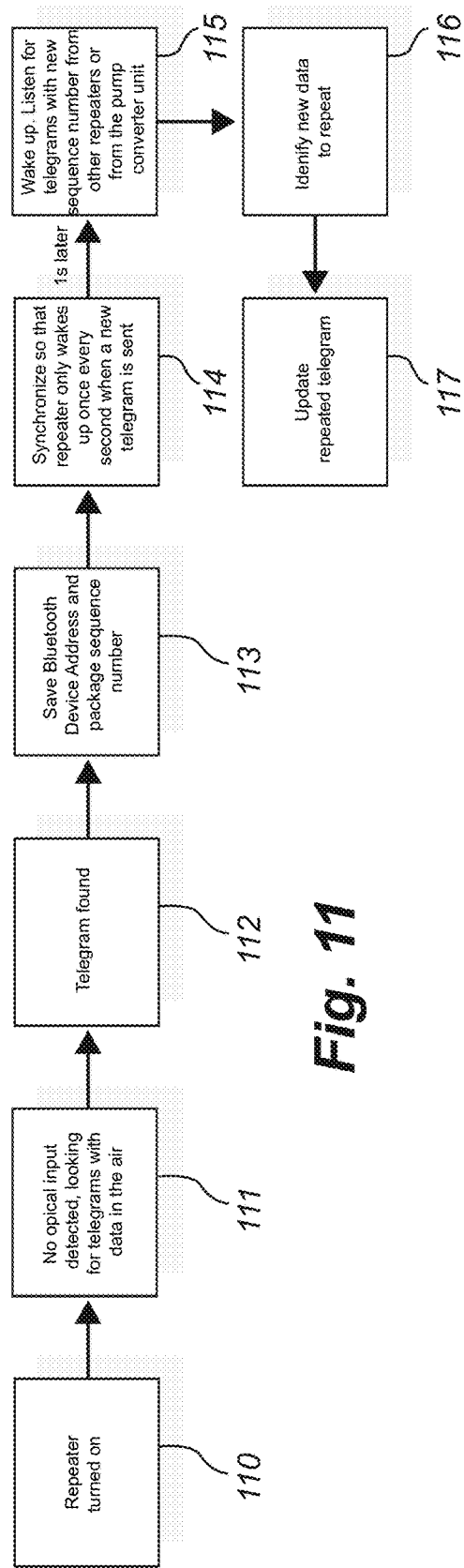
FIG. 11 shows an algorithm of the electronic converter unit according to the invention.

FIG. 11 shows what happens in the software of repeaters 86 and 87. After being switched on, the repeater 86 looks for optical input, 111. As there is no optical input because the repeater is not placed on a pump, the repeater realizes that it is a repeater. It starts looking for telegrams. Such telegrams are caught by an antenna inside the repeater 86, more precisely the antenna placed inside Bluetooth® unit 42 (see FIG. 4). Once a telegram is detected (112, FIG. 11) the repeater 86 stores the Bluetooth® address of the sender (the electronic converter unit 30 mounted on the pump), and also stores an identifying number (or sequence number) of the telegram. Pos. 113 shows this. The communication line is now established, and a synchronization between repeater 86 and electronic converter unit 30 is made. More precisely the communication between these two units is aligned so that repeater 86 is active exactly at those timings where a new telegram from electronic converter unit is sent. In all other idle periods the repeater 86 is sleeping, see pos. 114 and 115 of FIG. 11. This saves battery power in repeater 86. Repeater 86 is now ready to receive telegrams to be relayed to other units (116 and 117). It will awaken or listen only once per second. Once a telegram is received, which will be one of the four telegrams described earlier, the repeater 86 copies the telegram and passes it on to the next level, either repeater 87 or smart phone 50. Before passing the telegram on to the next receiver the repeater checks the sequence number of the telegram, which number was allocated to the telegram by the first electronic converter unit 30. The sequence numbers are unique and between 1 and 127 and may be incremented each time a telegram is sent out. If the repeater receives a telegram twice with the same sequence number it will discard the second telegram because this telegram probably is sent by another repeater. It must be avoided that two repeaters are locked together in an eternal messaging.

The antenna of the repeater 86 is preferably made as a conductor on a printed circuit board. The antenna is optimized and designed for functioning as sender when placed on the pump control housing 73. However, when sending as a repeater the signal strength is lower because the repeater is not placed in its optimum transmission environment.

Figure 12:
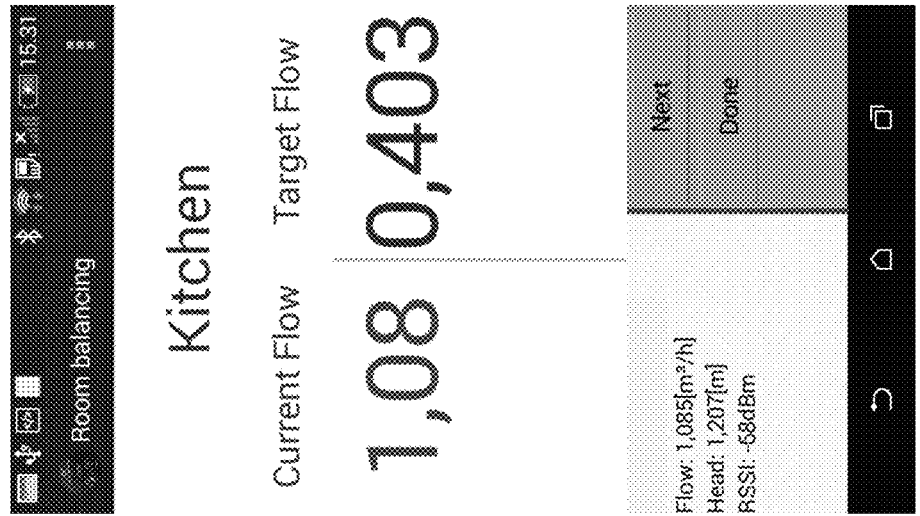
FIGS. 12 and 13 show screen displays from an app used for balancing said heating system.
Figure 13:
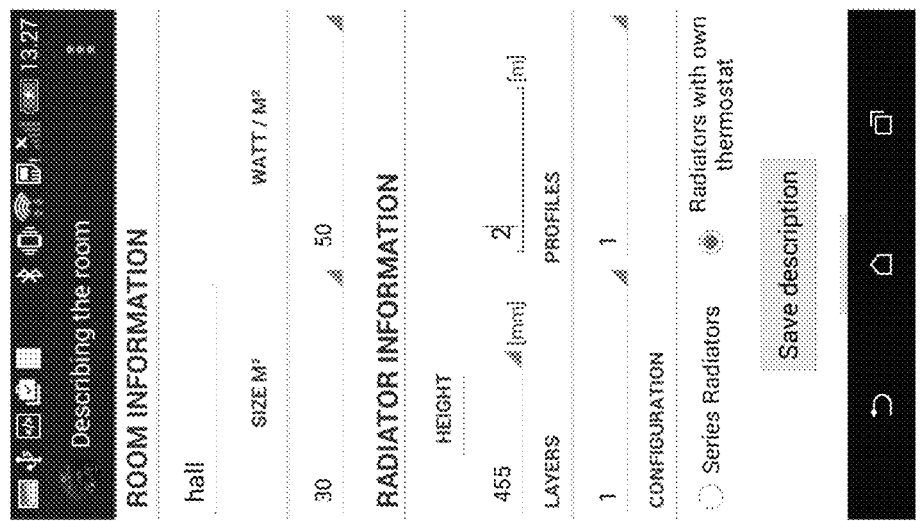

FIG. 12 shows the balancing app in use on smart phone 50. The screen is prompting the service technician for input about heating relevant parameters describing a kitchen room at storey 95. Relevant information is e.g. the size in square meters of the room. Further he is prompted for information about the radiator height. Other parameter values are input in the app on screens not shown. After finishing the data input the app is ready to calculate and assist the service technician in the balancing process. Based on the input values, the needed emission power or heat for the heating element is thus calculated by the app, which in turn makes it possible to calculate a design flow, which is needed in order to achieve the required emission of heat from the heating element, as the heating fluid passes through the heating element. As already described all but one radiator is closed when doing a balancing. Pump 72 is then started. The pump controller placed in housing 73 sends via diode 18 a data package to electronic converter unit 30. Electronic converter unit 30 converts the optical signal to a Bluetooth® signal, which is received by repeater 86 (FIG. 10) via its antenna. The signal is relayed to repeater 87 and then to smart phone 50. The current flow through the pump is displayed in the app and shown in the left hand side of FIG. 13 and compared to the calculated target or optimum flow. During the balancing operation the current flow, i.e. the actual flow, through the kitchen line is thus shown on the screen. The target flow, or desired value, as calculated by the app, which uses a hydraulic model with parameter values determined by the app, is shown, and the operator is now adjusting the balancing valve on the heating element or radiator 80 to lower the flow rate through the heating element in order to meet the target flow. Once the current flow is equal to or close to the target flow the operator must press the "Done" button, and can via "Next" continue to balance the radiator in the next room. Each of the balancing valves (not shown) on the radiators are adjusted in sequence so as to meet the design flow for each heating element by tracking the current flow rate in the app as the corresponding balancing valve is adjusted. When all radiators have been balanced a report is generated by the app, and the report can be accessed from the app or sent by email to relevant recipients.

The invention has been described with reference to advantageous embodiments. Thus, instead of balancing the invention can also be used solely for logging of data from the pump. Further the invention is not limited to heating systems with radiators but can as well be used in floor heating systems. The scope of the invention is thus not limited to the illustrated embodiments, and alterations and modifications can be carried out without deviating from the scope of the invention, which is defined by the following claims. The invention has for instance been described with reference to embodiments based on an optical readout of the operating status of the pump unit. However, it is recognised that the communication may also be based on other proximity sensor systems. The communication between the pump unit and the electronic converter unit may for instance be based on RFID or NFC technology. The communication between the pump unit and the electronic converter unit may also be based on sound signals or other suitable signals.

REFERENCE NUMERALS

| | |
|---|---|
| 10 | Pump unit |
| 12 | Housing/terminal box |
| 14 | Front end/display |
| 16 | Display units |
| 18 | Light source/diode |
| 20, 21 | Pipe flanges |
| 22 | Frequency transformer |
| 24 | Control unit |
| 28 | Window |
| 29 | Light/Optical signal/optical data |
| 30 | Electronic converter unit |
| 31 | Housing |
| 32 | Fasteners |
| 34 | Display/Indicator |
| 36 | Bluetooth |
| 37 | Optical transparent layer |
| 38 | Mesh structure/conductive layer |
| 39 | Ground |
| 40 | Photo detector |
| 41 | Communication unit |
| 42 | Bluetooth converter/transmitting means |
| 43 | Radio signal transmission |
| 45 | Aperture |
| 46 | Second signal detector/antenna |
| 47 | Antenna |
| 50 | External communication device/smart phone |
| 52 | Display |
| 60-67 | Data packages, telegrams, and data contents |
| 70 | house |
| 72 | Centrifugal pump |
| 73 | Pump housing |
| 75 | Boiler |
| 78, 79 | Pipes |
| 80 | Radiators |
| 85, 88, 89 | Signals |
| 86, 87 | Electronic converter unit operating as repeater |
| 90 | Service technician |
| 92 | Concrete floors |
| 93-95 | Storeys |
| 96 | Basement |
| 100 | System for checking the operating status of a pump unit |

The invention claimed is:

1. An electronic converter unit to be arranged external to a pump unit, wherein the pump unit includes a housing, which comprises a signal source for emitting a signal, the electronic converter unit comprising:
a signal detector for detecting the signal emitted from the signal source of the pump unit;
a converter unit for converting the detected signal to an electrical signal; and
transmission means for transmitting the electrical signal to an external communication unit, wherein the electronic converter unit further is configured to operate in a signal converter mode using a first signal detector and a signal repeater mode using a second signal detector, and that the electronic converter unit is configured to automatically set itself to signal converter mode, if the first signal detector detects a signal from the signal source of the pump unit, and to signal repeater mode, if the first signal detector does not detect a signal from said signal source.

2. An electronic converter unit according to claim 1, wherein:
the electronic converter unit in signal converter mode receives the signal from the signal source of the pump unit; and
the electronic converter unit in signal repeater mode is configured to receiving electrical signals from an identical converter unit and relays the electrical signal to a further identical converter unit or the external communication unit.

3. An electronic converter unit according to claim 1, wherein the electronic converter is configured to send telegrams in a broadcasting mode, as unidirectional communication.

4. An electronic converter unit according to claim 1, wherein the electronic converter unit in repeater mode is configured to be synchronized with another identical electronic converter unit.

5. An electronic converter unit according to claim 1, wherein the electronic converter unit is configured to receive and transmit telegrams including data packages comprising at least first data packages and second data packages, and wherein the first data packages are transmitted according to a first repetition rate and the second data packages are sent according to a second repetition rate.

6. An electronic converter unit according to claim 5, wherein the first packages comprise time variable data about pump operation, comprised of measured or calculated actual flow rate, pressure, electrical current, electrical power and/or rotational speed of an impeller, and the second packages comprise static data comprised of pump model type, and serial number, and wherein the first repetition rate is higher than the second repetition rate.

7. An electronic converter unit according to claim 6, wherein the first repetition rate is at least three times larger and advantageously at least five times larger than the second repetition rate.

8. An electronic converter unit according to claim 1, wherein the electronic converter unit is adapted to be detachably coupled to the pump unit.

9. An electronic converter unit according to claim 1, wherein the signal source is a light source, and wherein the first signal detector is a photo detector for measuring the light emitted from the light source of the pump, and wherein the converter unit is adapted to converting optical signals to electrical signals, and wherein the second signal detector is an antenna.

10. An electronic converter unit according to claim 1, wherein the electronic converter unit comprises:
a RFID or near-field communication receiver;
a converter unit for converting RFID or NFC signals to electrical signals; and
transmitting means for transmitting the electrical signals to an external communication unit.

11. An electronic converter unit according to claim 1, wherein the converter device is adapted to wirelessly transmit the electrical signals as infrared or as a radio signal, such as GSM, CDMA, 3G, 4G and Bluetooth®.

12. A kit of parts comprising:
a pump unit;
a first electronic converter unit comprising a signal detector for detecting the signal emitted from the signal source of the pump unit, a converter unit for converting the detected signal to an electrical signal, and transmission means for transmitting the electrical signal to an external communication unit, wherein the first electronic converter unit is configurable to be operated in converter mode; and a second electronic converter unit comprising a signal detector for detecting the signal emitted from the signal source of the pump unit, a converter unit for converting the detected signal to an electrical signal, and transmission means for transmitting the electrical signal to an external communication unit, wherein the second electronic converter unit is configurable to be operated in repeater mode.

13. A system for checking the operating status of a pump unit, the system comprising:

a pump unit;

an external communication unit;

a first electronic converter unit comprising a signal detector for detecting the signal emitted from the signal source of the pump unit, a converter unit for converting the detected signal to an electrical signal, and transmission means for transmitting the electrical signal to an external communication unit, wherein the first electronic converter unit is operating in converter mode; and at least a second electronic converter unit comprising a signal detector for detecting the signal emitted from the signal source of the pump unit, a converter unit for converting the detected signal to an electrical signal, and transmission means for transmitting the electrical signal to an external communication unit, wherein the second electronic converter unit is operating in repeater mode.

14. A method of communicating between a pump unit and an external communication unit, such as a smart phone, the method comprising the steps of:

arranging a first electronic converter unit external to the pump unit, the first electronic converter unit automatically setting itself to operate in signal converter mode;

positioning one or more second electronic converters between the first electronic converter unit and the external communication device, the second electronic converter unit automatically setting itself to operate in signal repeater mode, such that the first electronic converter unit detects signals from the pump unit and converts the signals to digital telegrams or data packages that are transmitted as electronic signals, and the second electronic converter unit or units relays the digital telegrams or data packages to the external communication unit.

15. A method according to claim 14, wherein the electronic converter unit after being activated inspects a first signal detector input on the electronic converter unit and if the first signal detector input is idle then switches to signal repeater mode to receive digital telegrams or data packages on the second signal detector input.

16. A method according to claim 14 used for balancing heating elements in a heating system.

* * * * *